United States Patent [19]

Vreugde

[11] 4,110,729
[45] Aug. 29, 1978

[54] REFLECTION SEISMIC EXPLORATION: DETERMINING INTERVAL VELOCITY IN A SUBSURFACE LAYER

[75] Inventor: Theodorus L. J. Vreugde, Houston, Tex.

[73] Assignee: Texaco Inc., New York, N.Y.

[21] Appl. No.: 735,935

[22] Filed: Oct. 27, 1976

Related U.S. Application Data

[63] Continuation of Ser. No. 549,638, Feb. 13, 1975, abandoned.

[51] Int. Cl.² .............................................. G01V 1/28
[52] U.S. Cl. .................... 340/15.5 MC; 340/15.5 DP; 364/421
[58] Field of Search ............... 340/15.5 CP, 15.5 MC, 340/15.5 DP

[56] References Cited

U.S. PATENT DOCUMENTS

| | | | |
|---|---|---|---|
| 3,280,936 | 10/1966 | Mayne | 340/15.5 CP |
| 3,611,278 | 10/1971 | Guinzy | 340/15.5 DP |
| 3,794,827 | 2/1974 | Widess | 340/15.5 CP |

OTHER PUBLICATIONS

"Velocity Spectra–Digital Computer Derivation Velocity Functions", Taner et al., Geophysics, vol. 34, No. 6, Dec. 1969, pp. 859–881.
"Velocity Determination by Means of Reflection Profiles", Green, Geophysics, vol. 3, Oct. 1938, pp. 295–305.

*Primary Examiner*—Howard A. Birmiel
*Attorney, Agent, or Firm*—Thomas H. Whaley; Carl G. Ries; Ronald G. Gillespie

[57] ABSTRACT

A reflection seismic exploration system is disclosed which effectively reduces the influence of near surface irregularities, without actually knowing or measuring these irregularities, and accurately determines the velocity of a seismic signal between two reflectors, the normal travel time in the layer between the reflectors, and the thickness of the layer. Two consecutive shots, spaced apart along the surface, are fired into the same spread of detectors. Three different time-distance relationships are recorded: (a) the relative arrival times of the reflections from each of the two reflectors at each of an array of detectors for one of the shots, and the shot-detector distances along the surface; (b) the difference between the relative arrival times of the reflections of the two shots from the shallower reflector at each detector and the distances between each detector and the midpoint between the shots; and (c) the difference between the relative arrival times of the reflections of the two shots from the deeper reflector at each detector and the distances between each detector and the midpoint between the shots.

The first, second and third time-distance relationship are curve-fitted to defined expressions to find the values of selected coefficients of these expressions. These coefficient values are combined to find the normal interval time and the interval velocity in the layer between the two reflectors, which are indicative of the nature of the layer, and to find the thickness of the layer.

2 Claims, 12 Drawing Figures

INTERNAL VELOCITY MODEL

TIME-DISTANCE CURVE, PREFERRED POINTS

TIME-DISTANCE CURVE, NON-PREFERRED POINTS

REFLECTION SEISMIC EXPLORATION: DETERMINING INTERVAL VELOCITY IN A SUBSURFACE LAYER

This is a continuation of application Ser. No. 549,638 filed Feb. 13, 1975, now abandoned.

BACKGROUND OF THE INVENTION

The invention is in the field of reflection seismic exploration and relates specifically to accurately obtaining signals representing the normal interval time and the interval velocity of a seismic signal in a subsurface layer, and the thickness of that layer.

In reflection seismic exploration, a seismic signal source and a plurality of seismic signal detectors are arranged in an array which may be a row that is symmetric, i.e., with the source at the center of the row, or nonsymmetric. The source generates a seismic signal, for example, by a dynamite explosion at the bottom of a water filled hole drilled through the weathered layer, which emits energy that travels primarily as compressional waves. These compressional waves are reflected by interfaces separating layers with different acoustical impedances. The reflected seismic signals are detected by the detectors. Seismic data may be recorded on magnetic tapes in analog form, for in digital form by sampling the detector outputs and recording the samples as digital numbers. One complete record is called a seismogram and consists usually of twenty-four traces, each trace containing the output of one group of detectors in a spread of twenty-four detector arrays. Seismographic data are usually subjected to preliminary processing which compensates for the amplitude decrease with time, since the energy of the signal from the source decreases as it travels from the source to the reflective interfaces and back to the detector due to spreading of the seismic signal and attenuation. Another common preliminary compensation is for the varying thickness and seismic velocity of weathered material underlying different detectors and for variations in source and detector depths.

After such preliminary processing, the resulting seismographic data may be utilized to determine the seismic signal velocity from the characteristics of a curve plotted on a time-distance scale, where time is the time that the signal from the source takes to reach a detector after being reflected and the distance is the source-detector distance along the surface. The subject invention relates to finding a signal representing the velocity of the seismic signal, but not to the conventional way of determining the average signal velocity through several layers overlaying a reflector. Instead, the subject invention relates to finding a signal representing the seismic signal velocity within a subsurface layer which may be spaced from the surface by one or more layers of different material, because it is often desirable to know accurately the seismic signal velocity in a specific layer, for example, as an aid in identifying the material of which the layer consists, i.e., limestone, sandstone, etc. The invention is useful in subsurface formations comprising layers which may be either horizontal or dipping.

SUMMARY OF THE INVENTION

The invention is in the field of systems useful in reflection seismic exploration and relates specifically to accurately finding signals representing the normal interval time, as well as the velocity of a seismic signal in, and the thickness of, an individual subsurface layer which may be parallel to the surface or dipping with respect to the surface. A specific advantage of the invention is that it provides signals representing the interval velocity, the normal interval time and the thickness between two reflectors, which signals are substantially unaffected by weathering and subweathering irregularities in the Earth formation, elevation variations between detector locations, and shot depths, error in shot depths or in velocity surrounding shot depths, most lateral changes in overburden conditions, the effect of true or apparent dip of the subsurface layer, inception time of the reflections from the top reflector and bottom reflector, and lateral variations in reflection character due to lateral weathering changes or poor geophone plant. The contributing factor for these features of the invention is the use of signals representing differences of reflection times recorded at the same detector plant, rather than signals for absolute arrival times recorded at detector locations, and the fact that the detectors are not moved or in any way disturbed as between the necessary shots.

To find a signal representing the interval velocity in a subsurface layer in accordance with the invention, measurements are obtained for three different time-distance relationships. These time-distance measurements are combined with defined expressions to find the values of signals representing selected coefficients of these expressions. The found coefficient signals are combined in a defined physical manner to find a signal representing the interval velocity in the subsurface layer, and to additionally find signals representing the thickness of the subsurface layer and the normal interval time.

Specifically, to obtain measurements for the first time-distance relationship, a shot is fired, and signals are obtained at each detector representing the difference in arrival times of the reflections from the shallower and from the deeper reflector that bound the subsurface layer. Thus, for each detector there is a time value signal representing this time difference, and a distance value signal which represents the distance along the surface between the shot and the detector. To get measurements for the second and third time-distance relationship, two shots are fired consecutively at source locations spaced from each other along the surface. For the second time-distance relationship, each detector detects the difference between the arrival times of the reflection of each shot from the shallower reflector. For the third time-distance relationship, each detector detects the difference between the arrival times of the reflection of each shot from the deeper reflector. For the second and third time-distance relationships, the distance values are the distances of the respective detectors from the midpoint between the shots.

The three shots are fired into the same set of detector (geophone) plants; i.e. the plant and alignment of detectors are not changed or touched between the three shots.

The measurement for each of the first, second and third time-distance relationship which have been so obtained are combined with defined expressions to find the values of signals representing selected coefficients of these expressions. Then, the found coefficient signals are combined in a defined physical manner to yield a signal representing the interval velocity of the seismic signal within the subsurface layer bound by the two reflectors, and to yield additionally a signal representing the thickness of the layer, and a signal representing the normal interval time.

In actual practice, a total of only two shots may be fired, and the reflections for either one of them, or from both of them, may be used in obtaining measurements for the first time-distance relationship. Enough time is left between shots so that each shot produces a complete seismogram.

DETAILED DESCRIPTION

In reflection seismic exploration, a seismic signal source and a plurality of detectors of reflected seismic energy are arranged in an array which may be a row that is symmetric, i.e., with the source at the center of the row, or nonsymmetric, for example, with the source at one end of the row. The source generates a seismic signal which propagates downwardly primarily as a compressional wave. When the signal reaches an interface between two layers of different acoustical impedances, it is partly reflected and partly refracted. The reflected seismic signal is detected at each of the detectors, and the refracted signal continues downwardly, until it encounters another interface where it is again partly reflected and partly refracted, etc.

Figure 1:
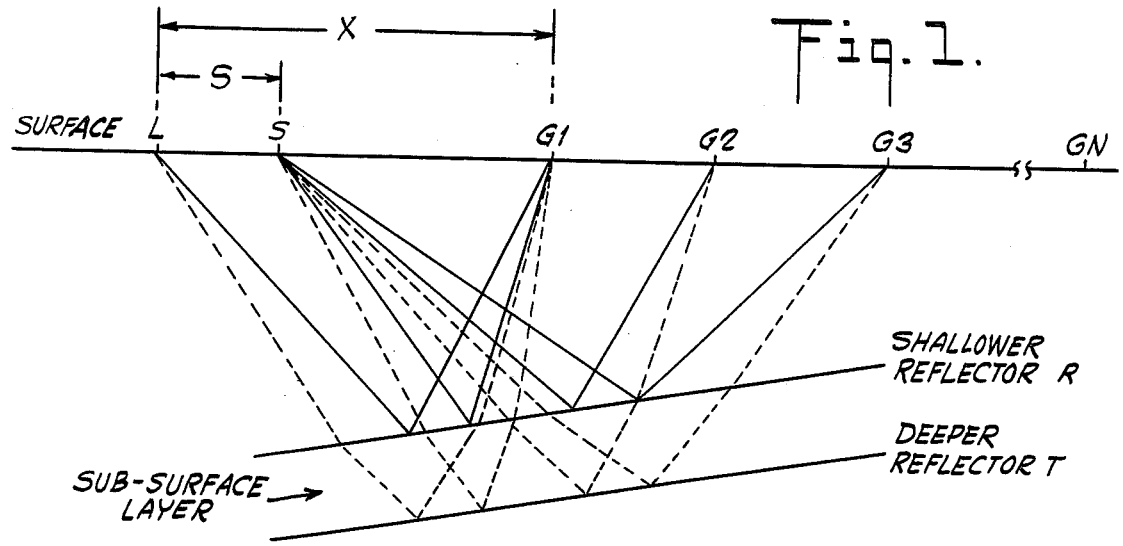
FIG. 1 illustrates the ray paths of seismic signals generated at two sources and detected at a spread of detectors after reflection from the shallower and the deeper reflector bounding a dipping subsurface layer.

A simple array of this type is shown schematically in FIG. 1, where the top horizontal line designates the Earth surface and the two sloping lines which are parallel to each other designate a shallower reflector R and a deeper reflector T bounding a subsurface layer.

In the subject invention, measurements for a first time-distance relationship are obtained by firing a single shot, and measurements for a second and a third time-distance relationship are obtained by the consecutive firing of two shots spaced apart along the surface. The second shot is fired only after a complete record has been obtained for the reflections from the first shot. In accordance with the invention, the detectors are left untouched between the shots. The detectors are not moved or replanted or disturbed in any way between the firing of the shots in order to exclude any changes in the transmission characteristics of the near surface conditions or detector plant.

Referring to FIG. 1, shots L and S are fired at two locations which are spaced apart along the surface by a known distance S, and the reflections of the seismic signals from the shots are detected at a linear array of detectors located to the right of the shots. For simplicity, only detectors G1, G2, G3 and GN are shown, it being understood that this may be a conventional array of twenty-four detector groups. Also for simplicity, the shots and the detectors are shown as being along the same line on the Earth surface, which in fact they may be at different elevations.

For the configuration shown in FIG. 1, each of the detectors detects four reflections which are of interest in the subject invention. Thus, detector G1 detects the reflections from reflectors R and T of the signal from the shot L and the reflections from reflectors R and T of the signal from the shot S. What is important in the subject invention is the time difference between the detections of these reflections; hence, factors which equally affect the total travel time of the reflected signals detected at each detector do not affect the accuracy of the results obtained according to the invention.

Figure 2:
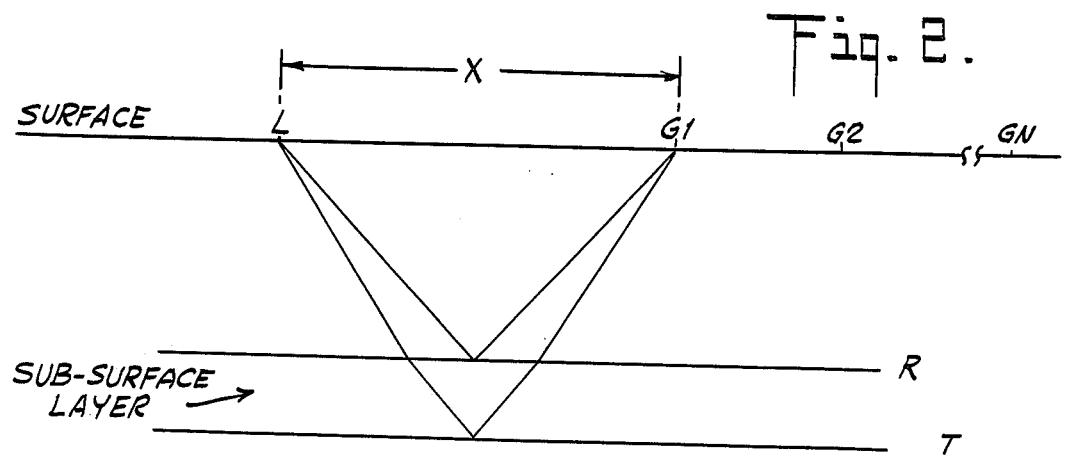
FIG. 2 illustrates the ray paths of seismic signals which are detected at a single detector group after reflection from the shallower and the deeper reflector bounding a subsurface layer.

In FIG. 2, a single shot L is fired, and each of the detectors G1 through GN detects the reflections of that shot from reflectors R and T. Thus, for each of the detectors G1 and GN there is a time value signal which represents the difference between the arrival times of the reflections from R and from T, and a distance value signal which is the known (measureable) distance along the surface between shot L and the detector. For detector G1, the time value is the difference between the arrival times of the two illustrated rays and the distance value is the shown distance X. When shot L is fired, the arrival times of the reflections from R to T are recorded on a seismogram, and the time difference between the reflections detected at each detector is found. The result is a set of value pairs, one value pair for each detector, each value pair comprising a time value representing the difference between the arrival times at the detector of the reflections from R and T, and a distance value representing the known shot-detector distance along the surface. This set of time-distance values is a first time-distance relationship defining a first time-distance curve.

Figure 3:
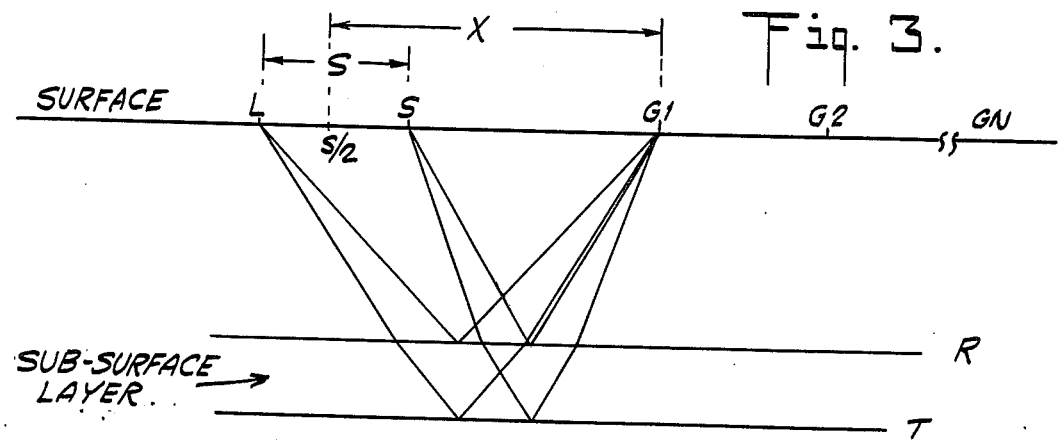
FIG. 3 illustrates the ray paths of seismic signals from two sources which are detected at a single detector group after the signal from each source is reflected from the shallower and the deeper reflector bounding a subsurface layer.

Referring to FIG. 3, the same, undisturbed array of detectors G1 through GN now detects the reflections resulting from shots L and S which are spaced from each other along the surface by a distance S. Detector G1 detects the reflections from the shallower reflector R of the signals from each of the shots, and the reflections from the deeper reflector T of the signals from each of the same shots. Each of the other detectors detects a similar set of the four reflections.

The time differences of interest are: (1) the difference between the arrival times at each detector of the reflections from R, and (2) the difference between the arrival times at each detector of the reflections T. Thus, for each detector, there is a second value pair comprising a time value representing the difference between the arrival times of the reflections from reflector R and a distance value representing the distance along the surface between the detector and the midpoint S/2 between shots L and S, and a third value pair comprising a time value representing the difference between the arrival times of the reflections from reflector T and a distance value representing the distance between the same detector and the same midpoint S/2. For example, for detector G1 there is a second value pair comprising the difference between the arrival times of the two illustrated rays reflected from R and a distance value which is the shown distances X, and a third value pair comprising the time difference between the arrivals of the shown rays reflected from T and the same distances X. For each of the detectors G1 through GN there are a second and a third value pairs of this type, and these value pairs define a second time-distance curve and a third time-distance curve respectively.

According to the invention, the measurements defining the first, second and third time-distance relationship are combined with defined expressions to find signals representing the values of selected coefficients of these expressions, and signal representing these selected coefficients are later combined in a defined manner to find the normal interval time, the interval velocity in the subsurface layer of interest and the thickness of that layer. The defined expressions are polynomials which relate time and distance. For the single shot measurements obtained from the arrangement shown in FIG. 2, the expression is of the form.

$$\Delta T_1 = B_0 + B_2 X^2 + B_3 X^3 + B_4 X^4 + \ldots \quad \text{(e-1)}$$

where the left-hand side of the expression is the time difference between the arrivals of the reflections from reflectors R and T at a surface point, and the term X in the right-hand side of the question is the distance along the surface of that point from shot L. For the second and third time-distance relationships, the expressions are respectively $$\Delta T_2 = C_0 + C_1 X + C_2 X^2 + C_3 X^3 + \ldots \quad \text{(e-2)}$$

and $$\Delta T_3 = C_0' + C_1' X + C_2' X^2 + C_3' X^3 + \ldots \quad \text{(e-3)}$$

where $\Delta T_2$ in the second expression is the difference between the arrival times at a point on the surface of the reflections from reflector R of the signals from shots L and S and the term X is the distance between that surface point and the midpoint, on the surface, between shots L and S; and where $\Delta T_3$ in the third expression is the difference between the arrival times at a surface point of the reflections from reflector T of the signals from shots L and S, and the term X has the same meaning as in the second expression.

The coefficients ($B_0$, $B_2$, $B_3$, $B_4$; $C_0$, $C_1$, $C_2$, $C_3$; and $C_0'$, $C_1'$, $C_2'$, $C_3'$; etc.) in the expressions may be found by curve fitting or other techniques, as described in detail below.

In accordance with the invention, if reflectors R and T bound a single layer of thickness h and velocity V, and the two shots are spaced by distance S:

(1) $B_0$ equals twice the normal traveltime $t$ in the interval (layer) between reflectors R and T;

(2) $B_0 = 2h/V$;

(3) $D_o = 2hV = \dfrac{S}{\dfrac{C_1' + C_2'\left(2\dfrac{C_o'}{C_1'} + \dfrac{S^2}{2} - \dfrac{C_2'}{C_1'}\right)}{S} - \dfrac{1}{C_1 + C_2\left(2\dfrac{C_o}{C_1} + \dfrac{S^2}{2} - \dfrac{C_2}{C_1}\right)}}$ (e-4)

(4) $D_0/B_0 = hV/(h/V) = V^2$.

If reflectors R and T bound a set of N layers i, then $$B_o = 2 \sum_{i=1}^{N} h_i/V_i \text{ and}$$

$$D_o = 2 \sum_{i=1}^{N} h_i V_i \text{ and}$$

$$D_o/B_o = \sum_{i=1}^{N} h_i V_i / \sum_{i=1}^{N} h_i/V_i$$

In the case where reflectors R and T bound a plurality of layers, the quotient $D_0/B_0$ represents the square of a velocity which is a weighted average of the individual velocities in the several layers; it is the normal traveltime weighted velocity of the individual velocity layers. Note that $h_i = t_i V_i$; and $$D_o/B_o = \sum_{i=1}^{N} V_i^2 t_i / \sum_{i=1}^{N} t_i$$

Thus, to find V, t and h (the velocity, normal interval time and thickness) for a layer between reflectors R and T in accordance with the invention, it is necessary to find $B_0$ and $D_0$.

Figure 4:
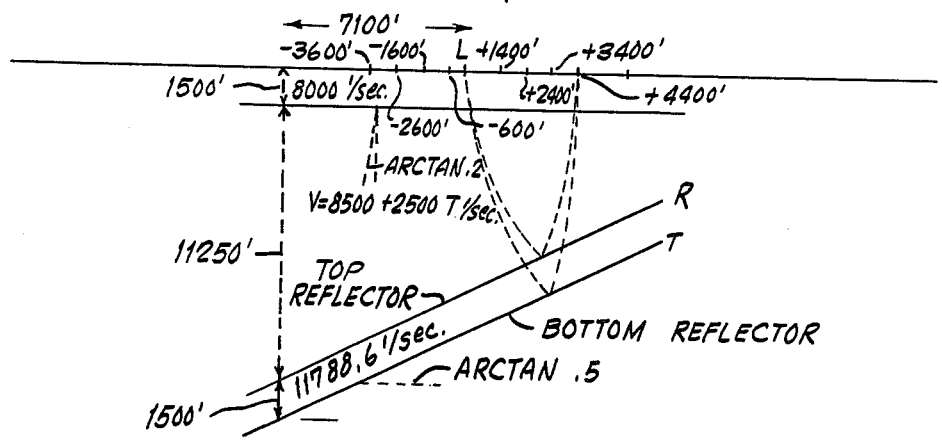
FIG. 4 illustrates an example of ray paths from a single shot.
Figure 5:
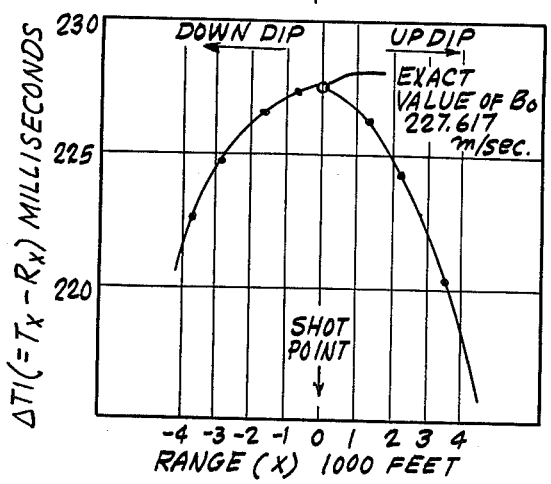
FIGS. 5, 6, and 7 illustrate graphical solutions for the normal traveltime of the formation interval of interest in FIG. 4.

One process of finding $B_0$ in accordance with the invention is illustrated in FIGS. 4–7. Referring to FIG. 4, a shot is fired at L, and the reflections from R and T are detected at each of the linear array of detector locations on the surface whose distance from the shot is indicated. Of course, the numerical values given in FIG. 4, as well as in other figures and in the specification, are only illustrative, and do not in any way limit the invention. Four detectors are downdip from the shot, with locations shown by negative distance values, and four reflectors are updip from the shot. The reflection time differences between reflectors R and T at each detector location are plotted versus distance from the shot in FIG. 5. $B_0$ is the point at the top of the curve, at the point corresponding to the shot location, and the value for the example in FIG. 4 is indicated in FIG. 5. Note that since expression (e-1) has no first power term, if it is truncated after the third power term, only three pairs of time difference values, i.e., only three detectors are needed to determine the unknown coefficients $B_0$, $B_2$ and $B_3$. These values should be from three of the detectors in FIG. 4.

Figure 6:
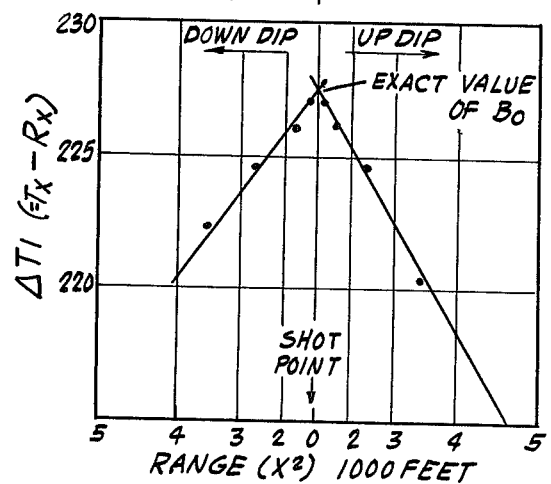
Figure 7:
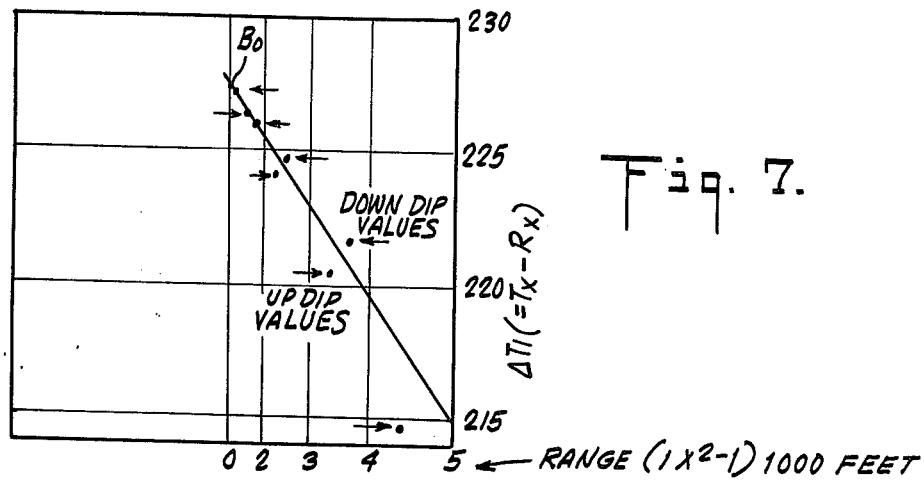

FIG. 6 is a plot of the same values $\Delta T1$ against a scale of $X^2$, where the X values for the updip and downdip locations have been kept separated according to the sign of X, although $X^2$ is positive in both cases. A straight line on the plot of FIG. 6 represents expression (e-1) truncated after $X^2$. If one draws a straight line through two points on the updip locations (the right-hand line in FIG. 6), the line crosses the zero axis above the value of $B_0$. If one draws a straight line through two points of the downdip locations (the left-hand line), this line crosses the zero axis below the exact value of $B_0$. FIG. 6 shows that on a plot of $\Delta T1$ versus $X^2$, a linear extrapolation of the shorter ranges toward the long ranges falls above the true values of $\Delta T1$ for updip ranges and below the true values of $\Delta T1$ for downdip ranges; this indicates the desirability of using the shorter ranges in the determination of the normal interval time. FIG. 7 shows the updip and downdip values plotted together with equal weight, and shows that a straight line approximation to all data crosses the zero axis practically at the exact value of $B_0$.

Figure 8:
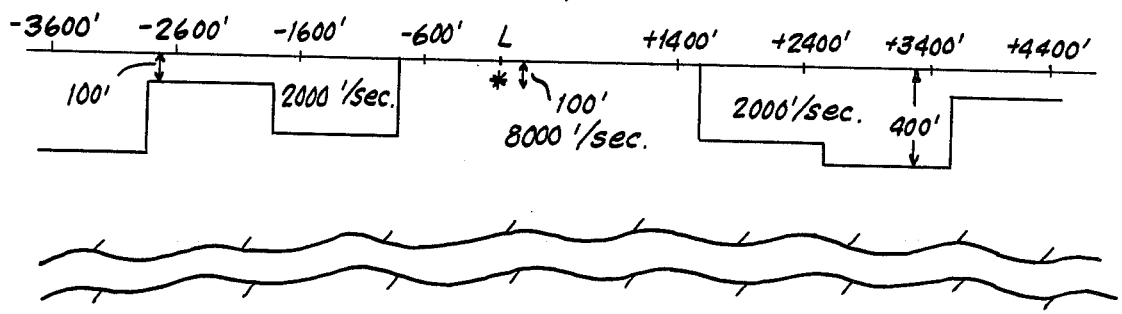
FIG. 8 illustrates a setting similar to that of FIG. 4, but with different overburden conditions.

While FIGS. 4–7 relate to a weathering-free case, with the shot at the surface, FIG. 8 illustrates the case where the near surface condition is changed by replacing some of the 8000 fps layer in FIG. 4 with a layer of 2000 fps of varying thickness, and by placing the shot at a depth of 100 feet. The value of $B_0$ for the situation illustrated in FIG. 8 can be found in the manner discussed in connection with FIG. 4–7, and the final result is substantially unaffected by the difference in formation.

The procedure discussed above yields a value for $B_0$, and thus yields a value for the ratio $h/V$. The other needed value, $D_0$, can be found as illustrated in FIGS. 9–11.

Figure 9:
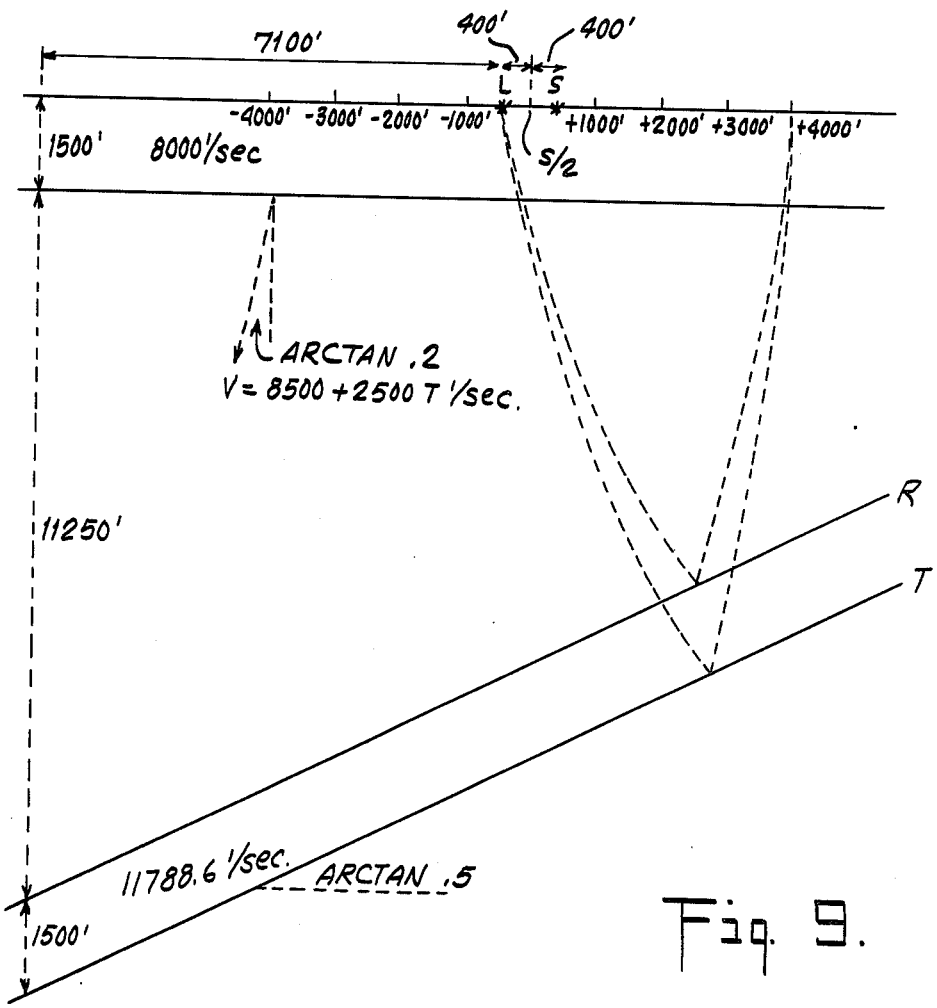
FIG. 9 illustrates a setting for two spaced-apart shots.

Referring to FIG. 9, two shots L and S are spaced apart along the surface, and downdip and updip detectors are located at the points whose distances from the mid-point between the shots are shown. To find the second term on the right-hand side of expression (e-4), there are two preferred positions for X, namely $X = 0$ and $X = \pm S/2$. At $X = 0$, $\Delta T2 = C_0 = SE_0 - S^2C_2/4$; at $X = +S/2$, $\Delta T2 = SE_0 = SC_1/2$; and at $X = -S/2$, $\Delta T_2 = SE_0 - SC_1/2$; where $E_0 = \sin\alpha/V_y$, $\alpha$ is the dip of R and T, and $V_Y$ is the velocity in the wedge above R.

Figure 10:
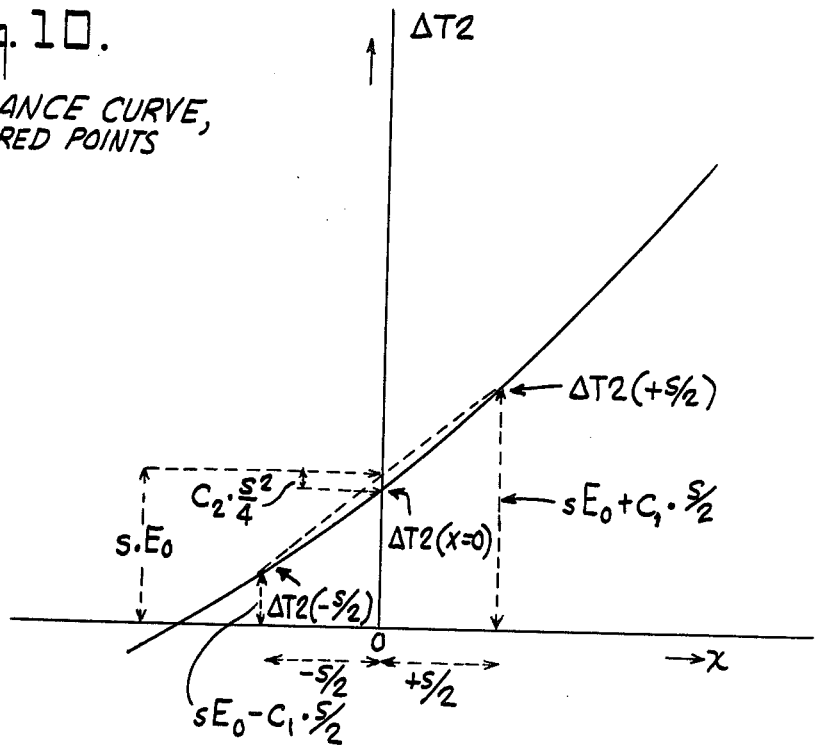
FIGS. 10 and 11 illustrate graphical solutions for the setting illustrated in FIG. 9.
Figure 11:
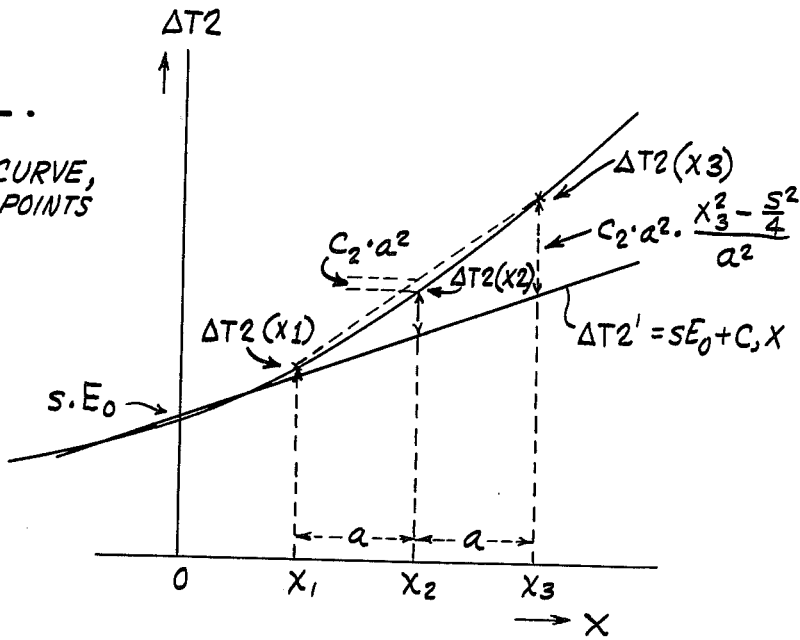

Referring to FIG. 10, which shows a plot of the reflection time difference $\Delta T2$ versus X, and the locations of $\Delta T2$ for X being 0, s/2 and $-S/2$, it is seen that: the straight line connecting points $\Delta T2$ $(+S/2)$ and $\Delta T2$ $(-S/2)$ cuts the time axis at a point equal to $SE_0$; the distance along the time axis from the point $SE_0$ to the point where the curve intersects this axis is equal to $\frac{1}{4}$ $S^2 C_2$; and the slope of this straight line is equal to the coefficient $C_1$. Thus, the values for the coefficients $C_0$, $C_1$, and $C_2$ of expression (e-2) can be found.

In practical field operations, these preferred positions for detectors may present difficulties. To have a detector midway between the shot locations and L and S (at $X = 0$) is feasible, and useful output may be expected. To place a detector at the shots (where $X = \pm S/2$) and expect a useful output is unreasonable. However, by placing detectors in line on both sides of each shot location, some distance away from the shot, times can be interpolated to the shot locations.

An Alternate process of finding the necessary coefficients of the expression (e-2) is illustrated in FIG. 11, where three detectors are positioned equidistantly at X1, X2, and X3 on one side of the midpoint between shots L and S. FIG. 11 shows the resulting curve. Since the curve is a part of a parabola, the straightline through $\Delta T2(X3)$ and $\Delta T2(X1)$ cuts the ordinate of $\Delta T2(X2)$ above $\Delta T2(X2)$ at a distance equal to $C_2 \cdot a^2$, where a = (X3−X2) = (X2−X1); $C_2$ can be found in this manner, and the times $\Delta T2$ for X1, X2 and X3 may now be corrected by subtracting $[C_2(X_i^2 − S^2/4)]$, $= 1, 2, 3$ respectively. The resulting three points are now represented by $$\Delta T2' = \Delta T2 - C_2(X^2 - S^2/4) = SE_0 + C_1 X \qquad \text{(E-5)}$$

This means that these three points fall along a straight line; the slope of this straight line gives $C_1$ and the intersection of this straight line with the time axis is at $SE_0$. Now $C_0 = SE_0 - S^2C_2/4$. In this manner the necessary coefficients $C_0$, $C_1$, $C_2$, of expression (e-2) can be found, and the last term on the right-hand side of equation (e-4) can be found.

In practical operation, there are typically more than three detector locations. By taking three detector locations at a time, the value of the midpoint for the term containing $C_2$ can be modified, using the $C_2$ determined from these three detector locations. In this fashion, $n$-2 points can be obtained if n detector locations are present. These points should fall along a straight line from which $C_1$, $E_0$, and $C_0$ may be determined.

Since the process of finding the first term on the right-hand side of expression (e-4) is similar, it will be repeated. Once the first term is found, the product hV can be found as indicated in expression (e-4).

The above discussion shows finding $B_0$ and $D_0$ from the time differences $\Delta T1$, $\Delta T2$ and $\Delta T3$. Once $B_0$ and $D_0$ are found: the velocity in the layer between reflectors R and T is the square root of the ratio of $D_0$ and $B_0$; the thickness is the square root of one-quarter of the product $B_0D_0$, and the normal traveltime $t$ is one-half the value of $B_0$.

Figure 12:
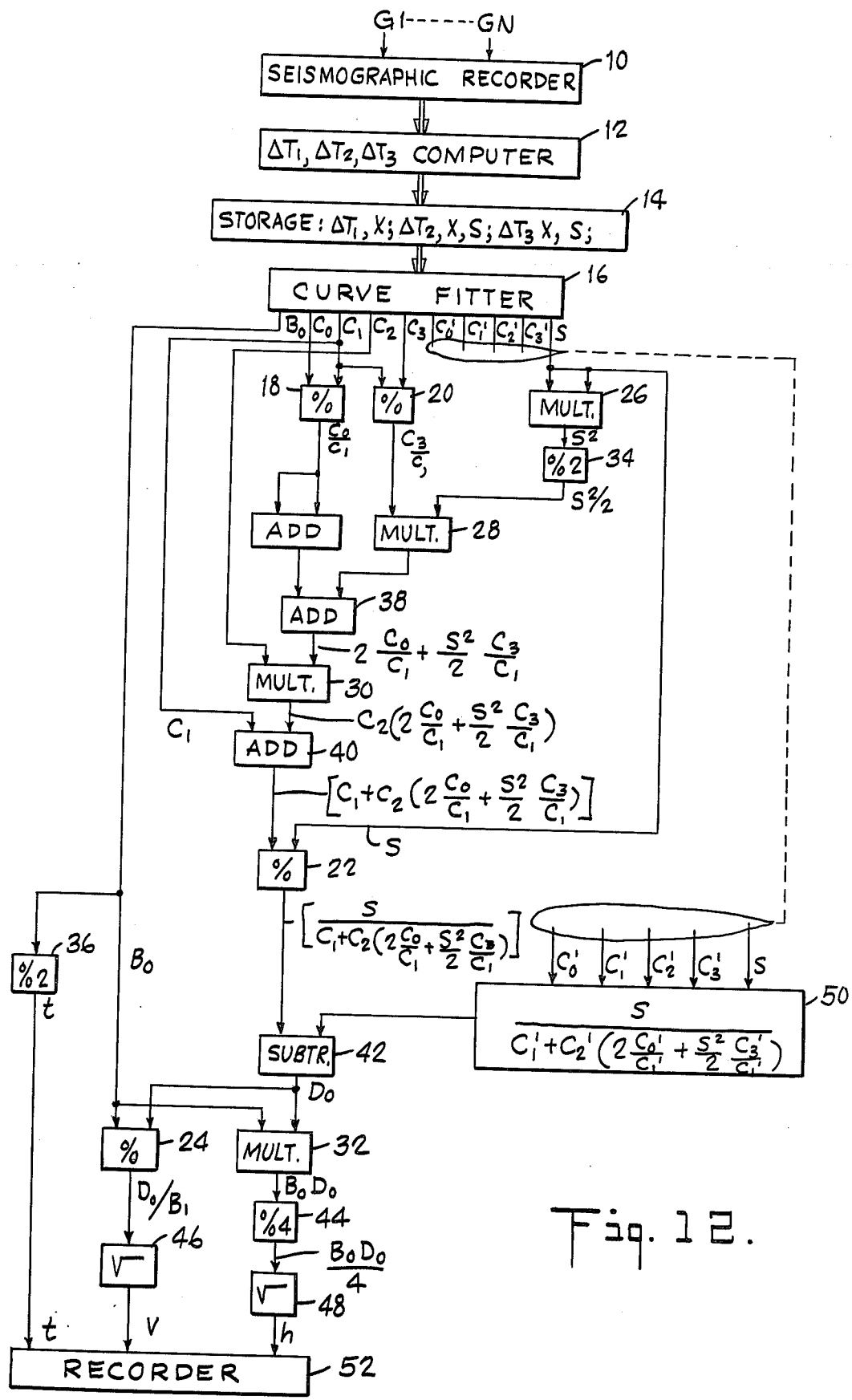
FIG. 12 illustrates a system for obtaining the interval velocity, thickness and normal traveltime of a subsurface formation in accordance with the invention.

An exemplary alternate system for finding the desired parameters of an earth formation bound between reflectors R and T in accordance with the invention is illustrated at FIG. 12. Detectors G1 through GN feed a seismographic recorder 10, and a computer 12 finds, for each detector, the time differences $\Delta T1$, $\Delta T2$, and $\Delta T3$ discussed above. A storage 14 stores, for each detector, the time and distance value pairs discussed above, and the measured distance S between shots L and S, the stored values being either in analog or in digital form. The recorder 10 can be a conventional seismographic recorder, such as the recorder producing the seismograms shown at FIG. 6 of U.S. Pat. No. 3,611,278. The computer 12 can be a conventional optical reader (such as a flying spot scanner) detecting the distance between the reflections of interest, or its function may be carried out by manually reading the distances of interest. The storage 14 may be a conventional tape recorder storing in digital or in analog form signals indicating the time differences found by the computer 12 and storing, for each time difference, the corresponding distance value, which can be provided by previously storing manually the distance values discussed above digitally through a suitable keyboard (not shown) or by entering the necessary analog signals by manually setting suitable potentiometers (not shown) connected to the storage 14. Storage 14 provides the stored values to a curve fitter 16 which takes the time distance pairs from the storage 14 and fits them to expressions (e-1), (e-2) and (e-3) as discussed above to find the necessary coefficient values. In a specific example, when the stored values are in digital form, curve fitter 16 may be a general purpose digital computer (e.g. IBM 360/65) operating under a prior art curve fitting applications program (e.g. Program No. 360D-13.008, IBM Systems Ref. Libr. Cat. of Programs, Cat. File No. Sm 360-20GS20-1619-7, p. 200) to fit the values from the storage 14 to the expressions (e-1), (e-2) and (e-3), or it may be a CDC 3500 operating under a suitable curve-fitting program, or a prior art special purpose machine programmed to solve simultaneous linear equations for the desired function. When the stored values are in analog form, the desired coefficients can be found as discussed in *Huskey* and *Korn*, Computer Handbook, McGraw-Hill, 1962, pp. 5–139 to 5–144.

The output of curve fitter 16 is signals representing the shown coefficients of expressions (e-1), (e-2) and (e-3), and these signals are processed by the shown analog network to provide signals representing the values of V, h, and T, i.e., signals representing the velocity, thickness and normal traveltime of the layer bound between reflectors R and T. The boxed elements following curve fitter 16 in FIG. 12 are conventional networks each carrying out the indicated function. For example, elements 18, 20, 22 and 24 are dividers each dividing the value of the signals shown at its inputs to provide the indicated output (Huskey and Korn, supra., pp. 3–56 to 3–58); elements 26, 28, 30 and 32 are multipliers each multiplying its two shown inputs to provide the indicated output (Huskey and Korn, supra., pp. 3–46 to 52, 7–12 to 14); elements 34 and 36 are networks each dividing its input by 2 to provide the indicated output (same as dividers 18–24, but having a fixed input, not shown, representing 2); elements 38 and 40 are adders, each adding its inputs to provide the indicated output (Huskey and Korn, supra., pp. 15-8 to 13); element 42 is a subtractor subtracting its inputs to provide the indicated output (Huskey and Korn, supra., pp. 8-2 to 8-4); element 44 is a network which divides its input by 4 to provide the indicated output (same as dividers 18–24, but having a fixed input, not shown, representing 4), and elements 46 and 48 are square root networks each providing an output which is the square root of its input (Huskey and Korn, supra., pp. 3–76, 5–12, 7–25, 26). Network 50 is identical to the combination of the elements which provide the output of divider 22, and functions in the same manner to provide an output signal representing the indicated expression. A recorder 52 records the found values for the interval velocity V, layer thickness h and normal traveltime t.

Alternately, the curve-fitter 16 may provide a digital output, and each of the following boxed elements may be corresponding digital network. Suitable elements are discussed in Huskey and Korn, supra., as follows: dividers -- pp. 15—15, 16 and 21; multipliers - pp. 21–74, 75, 89 and 94, adders - pp. 15–9 and 10; subtractors - pp. 14-3 and 15-12; and square-root extraction circuits - pp. 19-9 and 10.

Still alternately, the digital output of the curve-fitter 16 may be fed to a general purpose computer (e.g. CDC 3500), programmed to solve the expressions for $B_0$, $D_0$ and $D_0/B_0$ discussed above in order to find V, t and h. The necessary programs consist of Fortran statements corresponding directly to the referenced expression and the necessary statements providing for inputing and outputing data and for housekeeping functions.

While it may be preferred to use such programmed digital computer to find V, t and h, the other disclosed processes provide equally useful end results (e.g., the graphical process discussed in connection with FIGS. 4–12, the analog circuit process discussed in connection with FIG. 12 and the digital circuit process discussed in connection with the same FIG. 12).

By using reflection time differences for the determination of the desired parameters, the requirement of knowing the inception time of the reflections is removed. If the reflection pulses for the two reflectors bounding the formation of interest are the same shape, the requirement is then to determine the time difference between identical points of each reflection pulse, a task that may be carried out by visual observation of the pulse traces or by a suitable cross correlation process between the reflection pulses. Actually, the time in expressions (e-1) through (e-3) should be T-d, where d refers to the time from reflection inception to the actual pick of the reflection pulse. If d is a constant, i.e., independent of the time T, then d cancels in the time differences. If d is not a constant, but depends on the time T, one such dependency can be thought of as the effect of an additional layer of thickness D and velocity W, and it may be figured suitably into expressions (e-1), (e-2) and (e-3).

The use of reflection time differences minimizes therefore the effect of several unknowns that are difficult to determine, but which have to be carried along.

If the delay times d are not equal for the shallower and the deeper reflector, e.g., the deep reflector pulse has been picked a leg too late, the extra reflection time can be considered to be the result of traveling a corresponding extra distance through the formation for which the interval velocity is to be determined, and this can be figured into the expressions (e-1), (e-2) and (e-3) accordingly.

The foregoing determination of the formation parameters of interest imply that the shallower and the deeper reflector containing the formation of interest have equal dip. The dip is represented by the quantity $\alpha$, where $\alpha$ is actually the angle between the layers that contain the wedging velocity, or by generalization, a quantity that represents the effects of the wedging layer in the overburden. Actually, true dip does not enter the invented determination of the formation parameters of interest. Dip is not a parameter that is the object of determination, and is used in this invention only to connect the different expressions, so that its value need not be known but must only remain unchanged within a specific setup. For example, the seismic sources can be located at different elevations with respect to each other as well as with respect to the detector spread. An average line drawn through the sources and the detectors would likely not be level, but $\alpha$ would be related to this line and therefore not be a valid representation of dip.

Thus, one of the most important aspect of the invention is the use of time differences from travel times recorded at detectors which are meticulously kept unchanged to the same ground contact when making the two or more shots. The invention thus determines intralayer properties free from the effects of nearsurface irregularities by rendering these irregularities ineffective. The invention determines accurately the normal interval time, the interval velocity and interval thickness between two subsurface interfaces recognizable as reflectors on the seismic reflection records without having to know the conditions of weathering, elevation or goodness of detector plant and without having to make corrections for these conditions.

I claim:

1. A reflection seismic system for obtaining the interval velocity of seismic signals in a subsurface layer in an earth formation bound by a shallower and deeper reflector, the normal travel time in the layer and the layer thickness comprising:

first means for generating a first downwardly propagating seismic signal at a first location, second means for generating a second downwardly propagating seismic signal at a second location, a known distance from said first location, and at a different time, a plurality of means for detecting reflections of the seismic signals and providing corresponding signals, and V, T and H analog computing means connnected to the detecting means for providing signals V, T and H corresponding to the interval velocity, to the normal travel time and to the layer's thickness H, respectively, in accordance with the signals from the detecting means, in which the analog computing means includes means receiving the signals from the detecting means for providing a signal S corresponding to the distance between the generating means and for providing signals corresponding to coefficients $B_0$, $C_0$, $C_1$, $C_2$, $C_3$, $C_0'$, $C_1'$; $C_2'$, $C_3'$ for each detecting means in accordance with the signals from the detecting means and the following equations:

$$T_1 = B_0 + B_2 x^2 + B_3 x^3, \tag{1}$$

$$T_2 = C_0 + C_1 x + C_2 x^2 + C_3 x^3 \text{ and} \tag{2}$$

$$T_3 = C_0' + C_1' x + C_2' x C_3' x^3 \text{ where} \tag{3}$$

$T_1$, $T_2$ and $t_3$ are the time differences of reflection signals from the reflectors at the detecting means, X as used in equation (1) is the distance from the first generating means to the detecting means, and X as used in equations 2 and 3 is the distance from a mid-point between the two generating means to the detecting means, and signal means for providing signals V, T and H in accordance with signals S, $B_0$, $C_0$, $C_1$, $C_2$, $C_3$, $C_0'$, $C_1'$, $C_2'$ and $C_3'$.

2. A system as described in claim 1 in which the V, T and H analog computing means includes $D_0$ signal means receiving signals S, $C_0$, $C_1$, $C_2$, $C_3$, $C_0'$, $C_2'$ and $C_3'$ for providing a signal $D_0$ in accordance with the received signals and the following equation:

$$D_0 = \{S/[C_1' + C_2' (2 C_0'/C_1' + S^2 C_2'/SC_1') - S/[C_1 + C_2(2 CO/C_1 + S^2C_2/C_1)]\}, \tag{4}$$

means receiving signals $B_0$ and $D_0$ for providing signal V in accordance with signals $B_0$ and $D_0$ and the following equation:

$$V = \sqrt{D_0/B_0}, \tag{5}$$

means receiving signals $B_0$ and $D_0$ for providing signal H in accordance with signals $B_0$ and $D_0$ and the following equation:

$$H = \sqrt{(B_0 D_0)/4} \tag{6}$$

and means receiving signal $B_0$ for providing signal T in accordance with signal $B_0$ and the following equation:

$$T = B_0/2. \tag{7}$$

* * * * *